No. 737,688. PATENTED SEPT. 1, 1903.
E. S. WHEELER.
ATTACHMENT FOR DUST PANS.
APPLICATION FILED OCT. 25, 1902.
NO MODEL.
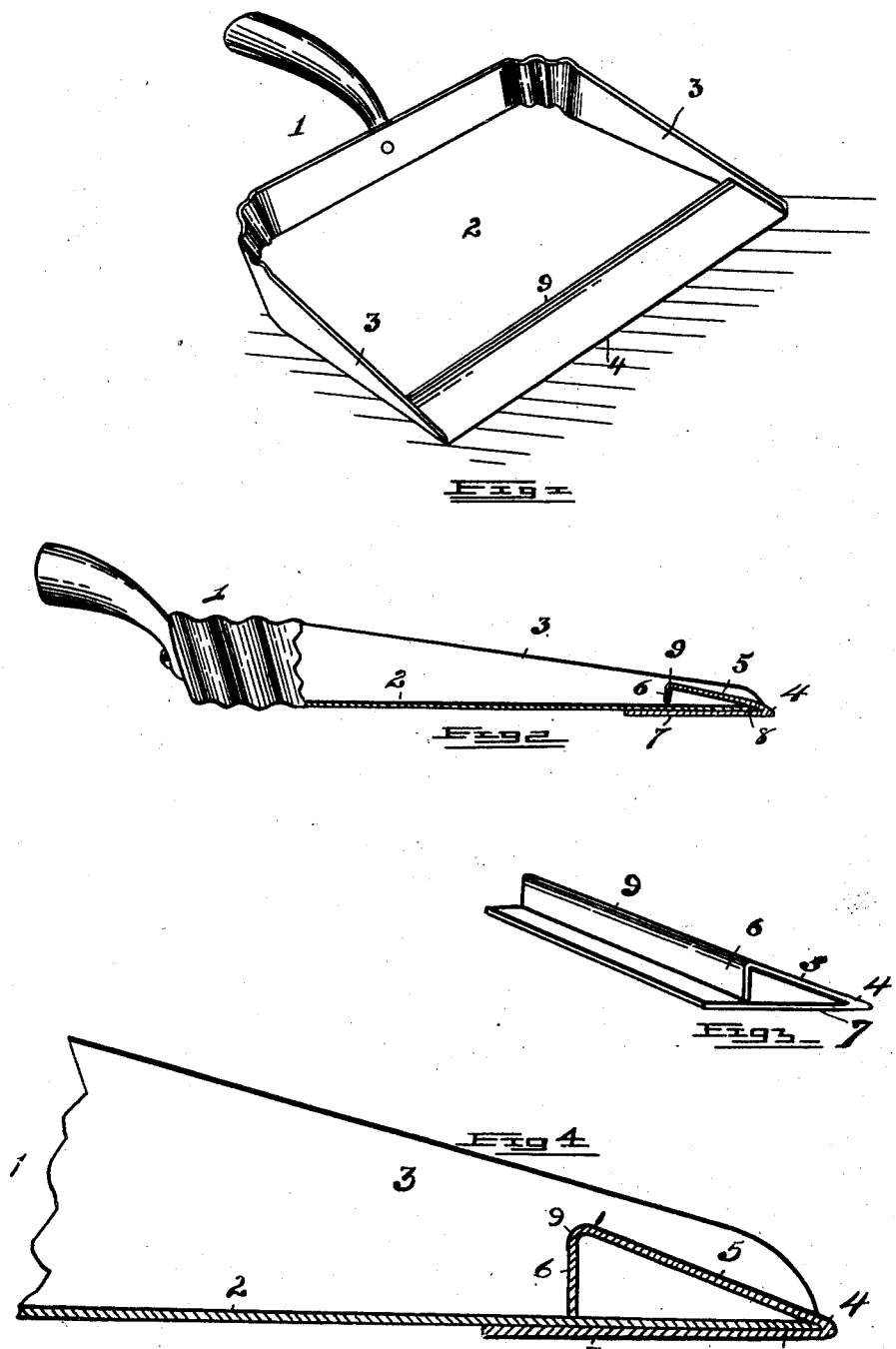

No. 737,688. Patented September 1, 1903.

UNITED STATES PATENT OFFICE.

EDGAR S. WHEELER, OF DETROIT, MICHIGAN, ASSIGNOR, BY MESNE ASSIGNMENTS, TO GARRETT A. CLEMENT, OF DETROIT, MICHIGAN.

ATTACHMENT FOR DUST-PANS.

SPECIFICATION forming part of Letters Patent No. 737,688, dated September 1, 1903.

Application filed October 25, 1902. Serial No. 128,720. (No model.)

*To all whom it may concern:*

Be it known that I, EDGAR S. WHEELER, a citizen of the United States, residing at Detroit, in the county of Wayne, State of Michigan, have invented certain new and useful Improvements in Attachments for Dust-Pans; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to an attachment for dust-pans; and it consists in the construction and arrangement of parts hereinafter fully set forth.

The object of the invention is to provide an attachment for dust-pans that may be readily placed upon the pan and in which the arrangement is such as to prevent the dust from leaving the pan after it has been swept therein, to protect the edge of the pan from becoming warped or bent and maintain it perfectly in contact with the floor, and to add to the general efficiency and stability of the pan.

The above object is attained by the device illustrated in the accompanying drawings, in which—

Figure 1 is a perspective view of a dust-pan provided with my improved attachment. Fig. 2 is a longitudinal sectional view through the bottom of the pan and through the attachment in position thereon. Fig. 3 is a perspective view of the attachment removed from the pan. Fig. 4 is an exaggerated sectional view through the bottom of the pan and the attachment.

Referring to the characters of reference, 1 designates an ordinary dust-pan having a bottom 2 and the vertical sides 3, all of which may be of any suitable construction.

The attachment comprises a strip of spring sheet metal which is folded over longitudinally at an acute angle, as at 4, the folded portion extending rearwardly at the requisite inclination, as shown at 5, and the rear edge of said folded portion being bent downwardly so as to stand in a vertical position, as shown at 6. The attachment is so formed that the lower edge of the folded portion 6 will stand close to the upper surface of the horizontal portion 7, so that when placed upon the pan the bottom of the pan may be forced between said vertical portion and said horizontal portion and said attachment held in place by the spring of the metal, which will cause said parts to forcibly bind upon the bottom of the pan.

It will be understood that when the attachment is placed upon the forward edge of the pan the inclined portion 5 will lie between the raised sides 3, whereby the attachment is held against lateral movement, while the forward edge 8 of the pan is crowded into the angle 4, formed by folding the metal upon itself to produce the rearwardly-inclined portion 5. The bottom of the horizontal part 7 extends along the bottom of the pan beyond the point where the vertical portion 6 engages the upper surface thereof, whereby the attachment is held firmly in place. When in position upon the pan, a shoulder 9 is formed, which rises above the pan's bottom and extends transversely of the pan between the sides 3, serving to retain within the pan all dust and dirt which may be swept therein over the inclined forward portion 5. The angle 4, where the metal of the attachment is folded, may be sharply formed so as to allow the dirt to be easily swept into the pan, while the sides 3, which rise above the inclined portion on either side, confine the dirt until it passes the shoulder 9. It will be seen that the folded portion of the metal forming the attachment embraces the front edge of the pan, thereby strengthening said edge and preventing it from becoming bent or warped. The character of the attachment is such that it may be readily slipped onto the pan, when desired, or easily and quickly removed. By shaping the attachment to correspond with the various shapes of pans upon the market it may be made to fit upon any of the pans in common use. When placed upon a pan, the retaining-shoulder 9 prevents the broom from dragging the dirt out of the pan when once it has been swept therein and retains the dirt securely in the pan until it is ready to be emptied.

While I have shown herein the preferred form of applying my attachable device, I do not wish to be limited to the specific construction shown, as other means of applying my attachable dust-retaining shoulder may be employed without departing from the spirit of my invention.

Having thus fully set forth my invention, what I claim as new, and desire to secure by Letters Patent, is—

1. A removable attachment for dust-pans consisting of a strip of sheet metal folded longitudinally at an acute angle so as to form a horizontal portion and an inclined portion extending thereover, said inclined portion being folded downward into a vertical portion whose lower edge stands adjacent said horizontal portion.

2. The combination with a dust-pan; of a removable attachment therefor consisting of a separate strip of sheet metal folded longitudinally at an acute angle so as to form a horizontal portion adapted to pass beneath the front edge of the dust-pan and an inclined portion adapted to pass above the same, said acute angle frictionally and removably clamping said front edge of the dust-pan, and a shoulder formed on the inclined portion.

3. The combination with a dust-pan; of a removable attachment therefor consisting of a strip of sheet metal folded longitudinally so as to form a horizontal portion adapted to pass beneath the front edge of the dust-pan and an inclined portion adapted to pass above the same and of less width than the horizontal portion, the inclined portion being folded downward into an upright shoulder between whose lower edge and the upper face of said horizontal portion the bottom of the dust-pan is clamped.

4. The combination with a dust-pan; of a removable attachment therefor consisting of a strip of sheet metal folded longitudinally at an acute angle so as to form a horizontal portion adapted to pass beneath the front edge of the dust-pan and an inclined portion adapted to pass above the same, said acute angle frictionally clamping said front edge of the dust-pan, the inclined portion being folded downward into an upright shoulder between whose lower edge and the upper face of said horizontal portion the bottom of the dust-pan is additionally clamped.

In testimony whereof I sign this specification in the presence of two witnesses.

EDGAR S. WHEELER.

Witnesses:
M. C. POOLE,
C. G. WRIGHT.